United States Patent [19]

Hong

[11] Patent Number: 5,150,200
[45] Date of Patent: Sep. 22, 1992

[54] PICTURE STILL CIRCUIT FOR TV RECEIVER HAVING SYNCHRONOUS SIGNAL DETECTION

[75] Inventor: Sam P. Hong, Kyungsangbook, Rep. of Korea

[73] Assignee: Goldstar Co., Ltd., Seoul, Rep. of Korea

[21] Appl. No.: 627,259

[22] Filed: Dec. 14, 1990

[30] Foreign Application Priority Data

Dec. 15, 1989 [KR] Rep. of Korea ............... 18653/1989

[51] Int. Cl.⁵ ............................................. H04N 9/74
[52] U.S. Cl. ...................................... 358/22; 358/188
[58] Field of Search ................... 358/22, 165, 183, 188

[56] References Cited

U.S. PATENT DOCUMENTS 5,034,820 7/1991 Cho ..................................... 358/183

FOREIGN PATENT DOCUMENTS 62-10980 1/1987 Japan ..................................... 358/165

Primary Examiner—James J. Groody
Assistant Examiner—Kim Yen Vu
Attorney, Agent, or Firm—Rosen, Dainow & Jacobs

[57] ABSTRACT

A camera video signal processing circuit for processing camera video signal whereby displaying on a monitor or a television receiver in the monitoring system and the like, and particularly, to a picture holding circuit for a still picture in a television receiver in which when video signal is not inputted from video camera, final picture is held whereby enabling to display as a still picture. The circuit comprises a luminance/color difference and synchronous signal separator an analog switching unit, an analog/digital converter, an encoder, a controller, digital/analog converters, a synchronous signal generator, an encoder, a synchronous voltage detecting unit, an integrator, a flip-flop and gates.

6 Claims, 3 Drawing Sheets

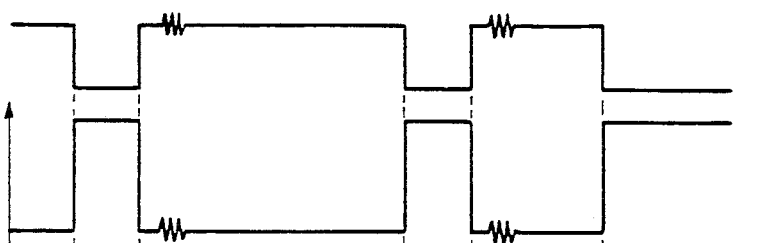
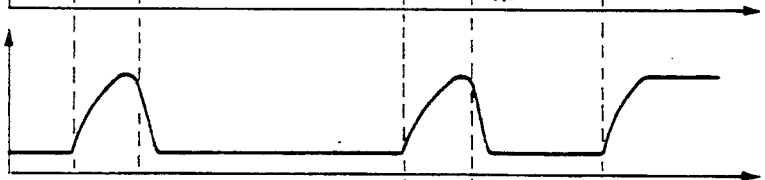
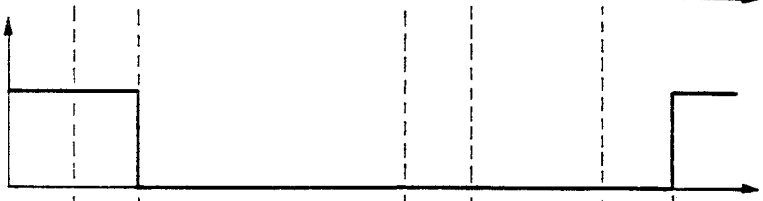
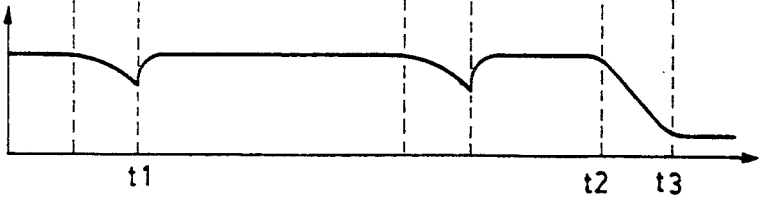
FIG.3A
FIG.3B
FIG.3C
FIG.3D
FIG.3E
FIG.3F

PICTURE STILL CIRCUIT FOR TV RECEIVER HAVING SYNCHRONOUS SIGNAL DETECTION

BACKGROUND OF THE INVENTION

The present invention relates to a camera video signal processing circuit for processing camera video signal in monitoring system and the like and displaying to a monitor or TV receiver and the like, and more particularly, to a still picture circuit in TV receiver in which, in case when video signal is not inputted from video camera, last picture is held whereby enabling to display as a still picture FIG. 1 is a camera video signal processing circuit used in conventional monitoring systems and the like, as shown in FIG. 1, the circuit comprises:

luminance/color difference signal and synchronous signal separator 1 which receives video signals VI from a video camera whereby separating horizontal synchronous signal HS, vertical synchronous signal VS, luminance signal Y and color difference signals R-Y, B-Y;

analog switching means 2 for selecting said luminance signal Y and color difference signals R-Y, B-Y;

analog/digital converter 3 for converting output signal of said analog switching means 2 to digital signal;

encoder 6 for encoding the selection state of picture holding switch SW1 and refresh switch SW2;

controller 4 which receives said horizontal and vertical synchronous signals HS, VS and output signal of encoder 6, and controlling the driving of said analog switching means 2 and said analog/digital converter 3, and receiving the output signal of said analog/digital converter 3 whereby storing to RAH 5 and outputting;

digital/analog converters 7-9 for converting the digital luminance signal Y and color difference signals R-Y, B-Y outputted from said controller 4 to analog signal;

synchronous signal generator 10 for generating horizontal synchronous signal HS, vertical synchronous signal VS, color burst signal CB and blanking signal BS; and encoder 11 inputs output signal of said synchronous signal generator 10 and output signal of said digital/analog converters 7-9, the operating process of such a conventional circuit will be described in below.

When video signals VI are inputted from a video camera through coaxial cable, said video signals VI are separated into horizontal and vertical synchronous signals HS, VS, luminance signal Y and color difference signals R-Y, B-Y at the luminance/color difference and synchronous signal separator 1 whereby being outputted, and said horizontal and vertical synchronous signals HS, VS are applied to the controller 4, and thereby becoming to operate as control pulse in case of recording a picture data to the RAM 5 at said controller 4.

And, said luminance signal Y and color difference signals R-Y, B-Y are sequentially selected at the analog switching means 2 according to the selection control signals SL1, SL2 of controller 4 whereby being outputted, that is, the selection control signals SL1, SL2 are repeatedly outputted from the controller 4 in the sequence of "00"→"01"→"10"→"11"→"00", accordingly said luminance signal Y and color difference signals R-Y, B-Y inputted to the input terminal a1-a4 of the analog switching means 2 are repeatedly selected in the sequence of Y→R→Y→Y→B→Y→Y to thereby be outputted, thus the signal outputted from the analog switching means 2 is converted to digital signal of M bits in synchronous with sampling signal CS of the controller 4 at the analog/digital converter 3 to thereby be applied to the controller 4. At this moment, the controller 4 outputs write control signal of high potential to its write terminal WR whereby making the RAM 5 to the write state, and designating the address of said RAM 5 through address bus AB, and becoming to record the digital signal inputted as above description through data bus DB, and outputting the read control signal to its read terminal from the controller 4 whereby the RAM 5 is made to the read state, and the address of said RAM 5 is designated and accordingly the digital signal recorded as above description to said address is read out to thereby be outputted.

Thus, the signals outputted from the controller 4, that is, the luminance signal Y and color difference signals R-Y, B-Y are converted to analog signal at the analog/digital converters 7, 8, 9 to thereby be applied to the encoder 11, and at this moment, horizontal and vertical synchronous signals HS, VS, color burst signals CB of 0° and 90°, and blanking signal BS are generated at the synchronous signal generator 10 to thereby be applied to said encoder 11, and according to this, the output signals Y, R-Y, B-Y of the digital/analog converters 7, 8, 9 and the output signals HS, VS, CB, of the synchronous signal generator 10 are synthesized at the encoder 11 to thereby be made into synthetic video signal VO and thereafter being displayed on a monitor or a TV receiver.

On the other hand, when the picture holding switch SW1 is short-circuited, said short-circuited state of the picture holding switch SW1 is encoded at the encoder 6 to thereby be applied to the controller 4, and according to this, the controller 4 reads out only the digital signal finally recorded to the RAM 5 whereby it is outputted, and therefore the holding picture is displayed on the monitor or the TV receiver, and when the refresh switch SW2 is short-circuited, said short-circuited state of the refresh switch SW2 is encoded at the encoder 6 to thereby be applied to the controller 4, and according to this, the controller 4 is operated as above description and thereby the motion picture becomes displayed.

However, in such conventional apparatus, it is made into a still picture only in case when the picture holding switch is short-circuited, and accordingly, in case when video signal is not inputted due to the reason that coaxial cable of video camera is cut off and the like, there has been a problem that final picture can not be recognized.

SUMMARY OF THE INVENTION

Therefore, it is an object of the present invention to provide a picture still circuit for a TV receiver in which in case when video signal is not inputted from video camera, video signal finally inputted from video camera can be displayed on a screen of TV receiver as a still picture.

Such object of the present invention is accomplished by detecting synchronous signal out of video signals inputted from video camera, determining the presence or absence of input of video signal according to the detection of said synchronous signal, in case when it is determined that video signal is inputted then processing the video signal by same manner as conventional way whereby displaying on a TV receiver, and in case when it is determined that video signal which is finally inputted and processed on the TV receiver as a still picture.

BRIEF DESCRIPTION OF THE DRAWINGS

FIG. 3A to FIG. 3F are waveform charts of each part of FIG. 2.

DETAILED DESCRIPTION OF THE INVENTION

Figure 2:
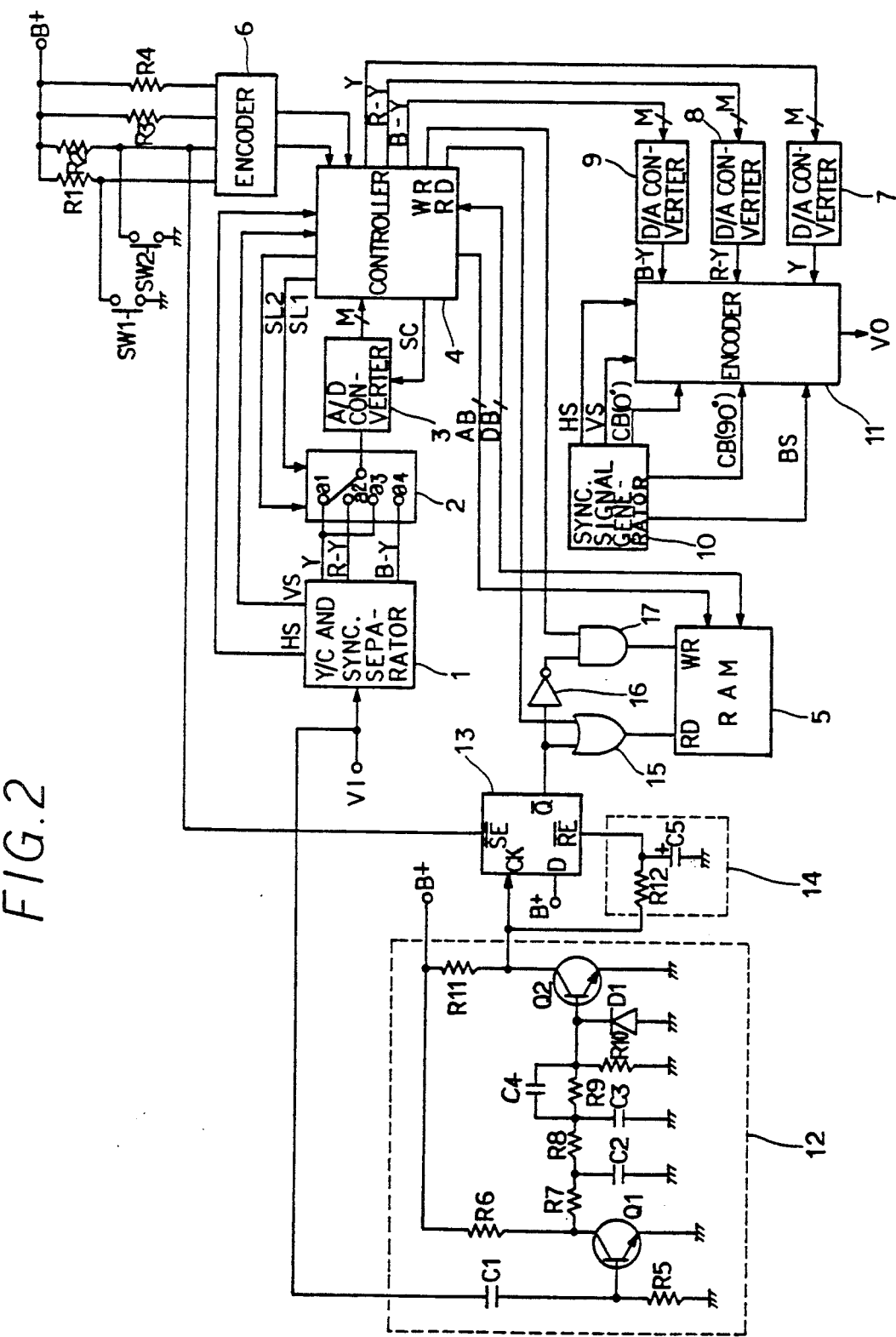
FIG. 2 is a picture still circuit diagram of a TV receiver according to the present invention.

Hereinafter, the present invention will be described in detail with reference to the accompanying drawings FIG. 2 is a picture still circuit diagram of a TV receiver according to the present invention, as shown in FIG. 2, a camera video signal processing circuit comprises;

a luminance/color difference signal and synchronous signal separator 1 which receives video signals VI from a video camera whereby separating horizontal and vertical synchronous signals HS, VS, and luminance signal Y and color difference signals R-Y, B-Y;

analog switching means 2 for selecting said luminance signal Y and color difference signals R-Y, B-Y, an analog/digital converter 3 for converting the output signal of said analog switching means 2 into digital signal;

an encoder 6 for encoding the selection state of picture holding switch SW1 and refresh switch SW2;

a controller 4 which receives said horizontal and vertical synchronous signals HS, VS and output signal of the encoder 6 and controlling the driving of said analog switching means 2 and analog/digital converter 3, and being inputted with the output signal of said analog/digital converter 3 whereby recording to RAM 5 and then outputting it;

digital/analog converters 7 to 9 for converting digital luminance signal Y and color difference signals R-Y, B-Y outputted from said controller 4 into analog signal;

a synchronous generator 11 for generating the horizontal and vertical synchronous signals HS, VS, color burst signal CB and blanking signal BS; and an encoder 11 which receives the output signals of said synchronous signal generator 10 and the output signals of said digital/analog converters 7 to 9 whereby outputting the synthetic video signal VO;

the circuit further comprises:

synchronous voltage detecting means 12 for detecting the synchronous signal of said video signal VI and outputting as voltage;

an integrator 14 for integrating the output signal of said synchronous voltage detecting means 12;

a flipflop 13 which receives the short-circuiting signal of the refresh signal SW2 the output signal of said integrator 14 and the output signal of said synchronous voltage detecting means 12 as a set signal, a reset signal and a clock signal;

an OR gate 15 which executes an ORing operation of the signal outputted to the output terminal $\overline{Q}$ of said flipflop 13 with the read control signal of said controller 4 whereby applying to the read terminal RD of said RAM 5; and an AND gate 17 which executes an ANDing operation of the output signal of inverter 16 for inverting the signal outputted to the output terminal $\overline{Q}$ of said flipflop 13 with the write control signal of said controller 4 whereby applying to the write terminal WR of said RAM 5.

The operation and effect of the present invention will be described in detail with reference to the waveform charts of FIG. 3A to FIG. 3F as follows.

When a video signal VI as shown in FIG. 3A is inputted from a video camera through a coaxial cable, said video signal VI is applied through a capacitor C1 to a resistor R5 and a base of transistor Q1, according to this, said video signal VI is converted and amplified at said transistor Q1 as shown in FIG. 3B whereby being outputted to its collector, and said output signal is integrated at resistors R7, R8 and capacitors C2, C3 as shown in FIG. 3C and thereafter it is applied through capacitor C4 and resistor R9 to the base of transistor Q2, therefore a waveform signal as shown in FIG. 3D is outputted to its collector.

Therefore, when a high potential signal is outputted (t1) from the collector of said transistor Q2, the flipflop 13 is operated with clocking by said high potential signal and thereby a low potential signal is outputted to its output terminal $\overline{Q}$ as shown in FIG. 3E. And, at this moment, the high potential signal outputted to the collector of said transistor Q2 is integrated at the integrator 14 as shown in FIG. 3F to thereby be applied to the reset terminal RE of the flipflop 13. Therefore, since the output voltage of the integrator 14 maintains more than a predetermined level at a state that synchronous signal is detected to a predetermined period at the synchronous voltage detecting means 12, the flipflop 13 is not reset whereby a low potential signal is continuously outputted to its output terminal $\overline{Q}$, and since said low potential signal is applied to one side input terminal of the OR gate 15, when the read control signal of high potential is outputted to the read terminal RD of the controller 4, a high potential signal is outputted from the OR gate 15 whereby the RAM 5 is made to a read state, further, since the low potential signal outputted to the output terminal $\overline{Q}$ of said flipflop 13 is inverted to high potential at the inverter 16 and thereafter it is applied to one side input terminal of the AND gate 17, when high potential read signal is outputted to the write terminal WR of the controller 4, high potential signal is outputted from said AND gate 17 whereby the RAM 5 is made to a write state.

Figure 1:
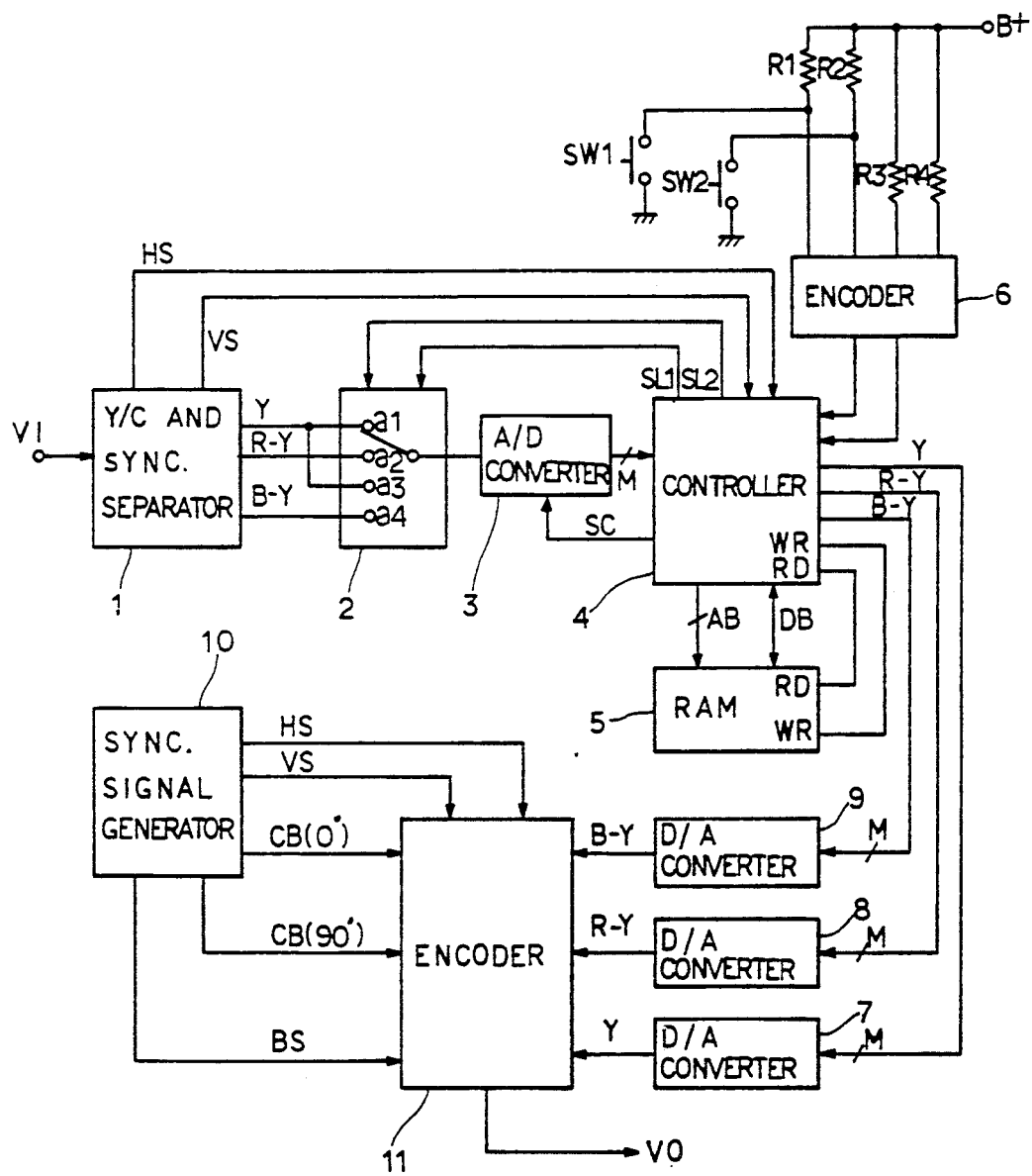
FIG. 1 is a conventional camera video signal processing circuit diagram.

Consequently, at this moment, the inputted video signal VI is processed similarly as the description of FIG. 1 whereby being outputted to synthetic video signal VO.

On the other hand, when a video signal VI becomes not to be inputted from the video camera through the coaxial cable (t2), since the transistor Q1 of the synchronous voltage detecting means 12 is maintained with OFF state, a high potential signal is outputted continuously to its collector as shown in FIG. 3B, according to this, since a high potential signal is continuously applied to the base of the transistor Q2 as shown in FIG. 3C, said transistor Q2 is maintained with ON state and thereby a low potential signal is continuously outputted to the collector a shown in FIG. 3D.

Therefore, the voltage charged to the capacitor C5 of the integrator 14 is discharged through the resistor R12 and transistor Q2, and when thus it is discharged whereby becoming to below the predetermined level (t3), the flipflop 13 is reset whereby a high potential signal is outputted to its output terminal $\overline{Q}$, and since said high potential signal is applied to one side input terminal of the OR gate 15, regardless of the read terminal RD signal of the controller 4 applied to its other side input terminal, a high potential signal is outputted from said OR gate 15 to thereby be applied to the read terminal RD of the RAM 5, and at this moment, since the high potential signal outputted to the output terminal $\overline{Q}$ of said flipflop 13 is inverted to low potential at the inverter 16 and then being applied to one side input terminal of the AND gate 17, irrespective of write terminal WR signal of the controller 4 applied to its other side input terminal, a low potential signal is outputted from said AND gate 17 whereby being applied to the write terminal WR of the RAM 5.

Consequently, at this moment, regardless of signal outputted to the read terminal RD and write terminal WR of the controller 4, the RAM 5 is maintained to read state, and according to this, only the digital luminance signal Y and color difference signals R-Y, B-Y are repeatedly read out and outputted at the controller 4, and these digital luminance signal Y and color difference signals R-Y, B-Y are converted into analog signals at the digital/analog converters 7 to 9 and thereafter being synthesized with output signal of the synchronous signal generator 10 at the encoder 11 whereby being outputted to synthetic video signal VO, and video signal finally inputted from video camera is displayed as a still picture on a TV receiver.

On the other hand, when the refresh switch SW2 is short-circuited in the aforemention state, since a low potential signal is applied to the set terminal $\overline{SE}$ of the flipflop 13, said flipflop 13 is set whereby a low potential signal is outputted to its output terminal $\overline{Q}$, and according to this, the RAM 5 is made to the read and write state by the write control signal and the read control signal outputted to the write terminal WR and read terminal RD of the controller 4, and thereby being operated similarly as the description of FIG. 1.

As described above in detail, according to the present invention, when while video signal is being inputted from video camera then the input of said video signal is stopped, since finally inputted video signal is displayed on a TV receiver as a still picture, not only it can usefully be used in monitoring system for monitoring a certain situation, but also there is effect that final condition can be readily grasped.

What is claimed is:

1. In a still picture circuit for a television receiver comprising:
   a luminance/color difference and synchronous signal separator for separating video signals inputted from a video camera into a synchronizing signal, a luminance signal and color difference signals;
   analog switching means for sequentially selecting said luminance signal and color difference signals;
   an analog/digital converter for converting the output signal of said analog switching means to a digital signal;
   a picture holding switch and a refresh switch, and an encoder for encoding the states of said holding switch and refresh switch;
   a controller connected to receive the output signal of said encoder for receiving the output signal of said analog/digital convertor and applying it to a RAM, said RAM having a read state ad a write state;
   digital/analog converters for converting luminance signal and color difference signal output from said controller; and
   an encoder connected to synthesize the output signals of said digital/analog converters with the output signal of a synchronizing signal digital generator; the improvement comprising:
   synchronizing voltage detecting means connected to detect the synchronizing signal of the video signal input from said video camera into a voltage;
   an integrator for integrating the output signal of said synchronizing voltage detecting means;
   a flip flop connected to receive the output signal of said synchronizing voltage detecting means and the output signal of said integrator as a clock signal and reset signal, respectively, for thereby generating read control and write control signals, respectively in response to the presence of absence of input of said video signal; and
   gates connected to set said RAM to its write and read state with said write control signal and read control signal of said flipflop, respectively, or regardless of the write control signal and read control signal, setting said RAM forcibly to its read state.

2. The circuit as claimed in claim 1, comprising means for resetting said flipflop when said refresh switch is closed.

3. In a still picture circuit for a television receiver comprising:
   input means for receiving a video signal;
   means for separating said video signal into a synchronizing signal, a luminance signal and color difference signals;
   controller means including means for converting the output of said separating means to a digital signal and storing the digital signal in a RAM having a read state and a write state;
   means for controlling said controller means to selectively set said RAM to its read and write states;
   digital/analog converting means for converting luminance signal and color difference signal output from said controller to analog from; and
   an encoder connected to synthesize the output signals of said digital/analog converters with the output signal of a synchronizing signal digital generator, the improvement comprising:
   detecting means coupled to said input means for detecting the synchronizing signal of a video signal input thereto;
   means coupled to said detecting means for selectively providing a write control signal when a synchronizing signal is detected thereby and a read control signal when a synchronizing signal is not detected thereby;
   means responsive to said read control signal for setting said RAM to its read state independently of said controller means; and
   means responsive to said write control signal for setting said RAM to its write state when said controller means is controlled to set said RAM to its write state, said means for selectively providing a write control signal and a read control signal comprises a flip flop, integrating means for integrating the output of said detecting means to reset said flip flop, and means clocking said flip flop with the output of said detecting means.

4. The still picture circuit of claim 3 wherein said means for setting said RAM to its read state comprises means for ORing the outputs of said flip flop and said controller means to said RAM.

5. The still picture circuit of claim 3 wherein said means for setting said RAM to its write state comprises means for ANDing the output of said flip flop and controller means to said RAM.

6. The still picture circuit of claim 3 further comprising means responsive to said means for controlling said controlling means for selectively controlling said means for providing read control and write control signals to output a write control signal.

* * * * *